United States Patent [19]

Lindner et al.

[11] Patent Number: 4,902,744
[45] Date of Patent: Feb. 20, 1990

[54] POLYMER MIXTURE AND ITS USE AS A MODIFIER FOR POLYVINYL CHLORIDE

[75] Inventors: Christian Lindner; Hans-Eberhard Braese, both of Cologne; Karl-Erwin Piejko, Bergisch Gladbach, all of Fed. Rep. of Germany

[73] Assignee: Bayer Aktiengesellschaft, Leverkusen, Fed. Rep. of Germany

[21] Appl. No.: 275,925

[22] Filed: Nov. 25, 1988

[30] Foreign Application Priority Data

Dec. 11, 1987 [DE] Fed. Rep. of Germany ....... 3742103

[51] Int. Cl.$^4$ ............................................. C08L 51/04
[52] U.S. Cl. ........................................ 525/71; 525/80; 525/83; 525/84; 525/85; 525/86
[58] Field of Search .................. 525/71, 80, 83, 84, 525/85, 86

[56] References Cited

U.S. PATENT DOCUMENTS

| | | | |
|---|---|---|---|
| 4,161,472 | 7/1979 | Lehr | 525/71 |
| 4,275,178 | 6/1981 | Yusa et al. | 525/71 |
| 4,423,188 | 12/1983 | Witschard | 525/80 |
| 4,456,733 | 1/1984 | Hornbaker | 525/71 |
| 4,469,845 | 9/1984 | Doak | 525/80 |
| 4,551,500 | 11/1985 | Doak | 525/71 |

*Primary Examiner*—Allan M. Lieberman
*Attorney, Agent, or Firm*—Connolly and Hutz

[57] ABSTRACT

A polymer mixture of (a) 45 to 50 parts by weight of a graft product of a mixture of 25 to 40 parts by weight acrylonitrile and 75 to 60 parts by weight styrene, α-methylstyrene, alkylmethacrylate or mixtures thereof on a particulate, highly crosslinked diene rubber having a rubber content of 20 to 40% by weight, (b) 45 to 10 parts by weight of a graft product of a mixture of 20 to 35 parts by weight acrylonitrile and 80 to 65 parts by weight styrene or α-methylstyrene on a particulate, highly crosslinked diene rubber having a rubber content of 50 to 75% by weight, the graft yield being greater than 60% by weight, (c) 10 to 50 parts by weight of a particulate, partially crosslinked, rubber-like copolymer of a $C_2$–$C_8$ alkylacrylate and/or butadiene containing up to 40% by weight (based on copolymer) acrylonitrile which has an average particle diameter ($d_{50}$) of from 0.1 to 0.3 μm and a gel content of 40 to 99% by weight and (d) optionally up to 5 parts by weight of a high molecular weight, uncrosslinked copolymer of styrene or methylmethacrylate and up to 40% by weight acrylonitrile having an intrinsic viscosity [η] (in dimethylformamide at 20° C. of >4 dl/g, a process for its production and its use as an additive in polyvinyl chloride molding compositions.

5 Claims, No Drawings

POLYMER MIXTURE AND ITS USE AS A MODIFIER FOR POLYVINYL CHLORIDE

This invention relates to a mixture of two selected rubber-based graft copolymers, a rubber containing nitrile groups and, optionally, a high molecular weight thermoplastic resin and to the use of this mixture as an additive for molding compositions based on polyvinyl chloride, more especially for the production of embossable films.

Polyvinyl chloride is a known man made material for the production of films. Polyvinyl chloride molding compositions which, in addition to polyvinyl chloride, also contain nitrile rubbers, plasticizing components and, optionally, more specific additives are used for lamination (DE-OS No. 32 04 144, European patent application 101 904). It is desirable that the constituents of these molding compositions be present in powder form so that they may readily be mixed homogeneously with the polyvinyl chloride likewise present in powder form.

The properties of molding compositions of the type in question have to satisfy particular requirements. Thus, not only are they required to show high toughness, breaking strength, flexibility, elasticity, elongation, cold crack resistance, heat resistance, adhesion and abrasion resistance, they are also required to lend themselves to processing into sheet-form materials, for example by calendering and deep drawing, to show balanced shrinkage and dimensional stability properties and to form surfaces which may be decoratively finished (for example by embossing).

According to the invention, it has been found that the polymer mixtures which form one of the subjects of the present invention may be added to polyvinyl chloride to form molding compositions which give particularly low-temperature-resistant films without, of course, any change in the complex property profile described above.

Accordingly, the present invention relates to polymer mixtures, more especially in the form of powders, of (a) 50 to 25 parts by weight of a graft product of a mixture of 25 to 40 parts by weight acrylonitrile and 75 to 60 parts by weight styrene, α-methylstyrene, alkylmethacrylate or mixtures thereof on a particulate, highly crosslinked diene rubber having a rubber content of 20 to 40% by weight, (b) 45 to 10 parts by weight of a graft product of a mixture of 20 to 35 parts by weight acrylonitrile and 80 to 65 parts by weight styrene or α-methylstyrene on a particulate, highly crosslinked diene rubber having a rubber content of 50 to 75% by weight, the graft yield being ±60% by weight and, more preferably, ±80% by weight, (c) 10 to 50 parts by weight of a particulate, partially crosslinked rubber-like copolymer of a $C_2$–$C_8$ alkylacrylate and/or butadiene containing up to 40% by weight (based on copolymer) acrylonitrile which has an average particle diameter ($d_{50}$) of 0.1 to 0.3 μm and a gel content of 40 to 99% by weight and (d) optionally up to 5 parts by weight of a high molecular weight, uncrosslinked copolymer of styrene or methylmethacrylate and up to 40% by weight acrylonitrile having intrinsic viscosities [η] (in dimethylformamide at 20° C.) of >4 dl/g.

In the context of the invention, a graft product is the reaction product of a graft polymerization. Since grafting is never complete, the graft product is always a mixture of the actual graft polymer with free copolymer of the graft monomers. The graft yield is the percentage of monomers actually graft polymerized out of the total of graft monomers present.

Graft products (a) according to the invention may be prepared, for example, by graft polymerization of 80 to 60% by weight and more especially 75 to 65% by weight of a monomer mixture of 25 to 40 parts by weight acrylonitrile and 75 to 60 parts by weight styrene α-methylstyrene, alkylmethacrylate, more especially styrene, onto 20 to 40% by weight and more especially 25 to 35% by weight of a particulate, highly crosslinked diene rubber, for example a polymer of 100 to 70% by weight butadiene and 0 to 30% by weight styrene, acrylonitrile and/or alkyl(meth)acrylate having average particle diameters ($d_{50}$) of 0.1 to 0.5 μm and gel contents of >70% by weight; the production of graft polymer such as these is known, for example by emulsion polymerization of the monomer mixtures in the presence of rubber latices at temperatures above 50° C. initiated by radical initiators, such as water-soluble inorganic peroxides.

Graft products (b) according to the invention may be prepared by graft polymerization of 50 to 25% by weight of a monomer mixture of 20 to 35 parts by weight acrylonitrile and 80 to 65 parts by weight styrene or α-methylstyrene onto 50 to 75% by weight of a particulate, highly crosslinked diene rubber, more especially polybutadiene, having average particle diameters ($d_{50}$) of 0.2 to 0.6 μm and gel contents of >70% by weight, the graft yield being >60% by weight, i.e. most of the polymerized monomer mixture is chemically bound to the rubber by covalent bonds Graft polymers such as these are known. They may be prepared, for example, by emulsion graft polymerization of the vinyl monomer mixtures in the presence of a rubber latex using a redox initiator system of organic hydroperoxide and ascorbic acid.

The rubber-like copolymers (c) according to the invention are particulate, partially crosslinked copolymers of a $C_2$–$C_8$ alkylacrylate (more especially butylacrylate, pentylacrylate, hexylacrylate) and/or butadiene with up to 40% by weight incorporated acrylonitrile and preferably with 20 to 35% by weight acrylonitrile; copolymers of a $C_2$–$C_8$ alkylacrylate with acrylonitrile are preferred. These rubbers have average particle diameters ($d_{50}$) of from 0.1 to 0.3 μm and gel contents of from 40 to 99% by weight and more especially from 75 to 99% by weight. They are known and may be prepared by radical emulsion polymerization at temperatures of >30° C. of monomer mixtures of up to 40% by weight acrylonitrile and 80 to 60% by weight alkylacrylate and/or butadiene. Particular conditions have to be established to obtain the partial crosslinking. Crosslinking (expressed by the gel content) with a relatively low crosslink density (expressed by the swelling index) is required. This combination of properties is obtained, for example, where the emulsion polymerization of acrylate monomers is carried out together with up to 1% by weight polyfunctional copolymerizable allyl compounds, more especially triallyl compounds, such as for example triallyl(iso)cyanurates.

Where butadiene is used as the monomer, there is no need to use polyfunctional vinyl or allyl monomers providing the emulsion polymerization is conducted in such a way that butadiene itself acts as crosslinking agent (for example by copolymerization at very high temperatures of above 40° C. or even above 60° C. or by polymerization to very high conversions).

Components (d) according to the invention are extremely high molecular weight homopolymers of methylmethacrylate and copolymers of styrene or methylmethacrylate with up to 40% by weight acrylonitrile which are still soluble in organic solvents. Methylmethacrylate/acrylonitrile copolymers having acrylonitrile contents of 20 to 35% by weight are preferred. The polymers (d) may be prepared by emulsion or suspension polymerization and have average molecular weights, expressed by the intrinsic viscosity [$\eta$], as measured in DMF at room temperature, of >4 dl/g and, more especially, of 5 to 15 dl/g.

Components (a) to (d) accumulate during their production as aqueous emulsions (latices) with solids contents of 20 to 50% by weight.

It is important that the polymer mixtures intended for the finishing of PVC be present in powder form so that they may be premixed with PVC before melt compounding. However, since some of the components of the polymer mixture, for example (b), and (c), tend to stick to one another, it is not readily possible to mix components (a) to (d) with one another.

The polymer mixtures according to the invention may be obtained as follows:

The emulsions (latices) of components (a) to (d) are mixed with one another in quantities corresponding to the required polymer composition. It is important during mixing to avoid the formation of agglomerates, i.e. it is important even during the preparation of the latices that the components are miscible with one another, for example through the choice of the emulsifiers and the pH value established, in order to avoid subsequent mutual precipitation of the emulsions. Phenolic antioxidants may be added after or during the mixing of the latices at around 20° to 70° C. (using conventional mixers).

The emulsion mixture may be coagulated by conventional methods (for example by addition of an electrolyte or by direct drying), washed and dried to form a powder. During subsequent processing, this powder may be mixed with powder-form PVC and further additives, such as known plasticizing, low molecular weight compounds or polymers, may optionally be added. The powder-form mixture may then be homogenized by melt compounding. The PVC-containing molding compositions are distinguished by a particularly advantageous combination of properties, particularly at relatively low temperatures.

The intrinsic viscosities were measured in dimethylformamide (cf. M. Hoffmann et al , "Polymeranalytik I und II", Georg Thieme Verlag, Stuttgart, 1977). The graft yield (cf. also Hoffmann et al , Polymeranalytik I und II) was determined by fractionation with separating liquids. The particle diameters are $d_{50}$ values and are determined by ultracentrifuge measurement (cf. W. Scholtan et al., Kolloidz. und Z. Polymer 250 (1972)).

EXAMPLES

Polymers used

Component (a):

An emulsion graft polymer of 15% by weight fine-particle . polybutadiene having an average particle diameter ($d_{50}$) of 0.1 μm, 15% by weight coarse-particle polybutadiene having an average particle diameter ($d_{50}$) of 0.4 μm and 70% by weight styrene/acrylonitrile ("SAN") copolymer containing 33% by weight copolymerized acrylonitrile. The polybutadienes have gel contents of 80 to 95% by weight. The graft polymer was prepared by aqueous emulsion graft polymerization using potassium peroxydisulfate as initiator.

Component (b):

An emulsion graft polymer of 50% by weight coarse-particle polybutadiene having an average particle diameter $d_{50}$) of 0.4 μm and 50% by weight styrene/acrylonitrile copolymer containing 28% by weight copolymerized acrylonitrile. The polybutadiene has a gel content of 89% by weight. The graft polymer was prepared by aqueous emulsion graft polymerization using cumene hydroperoxide/ascorbic acid as initiator, the graft monomers being grafted on in a graft yield of 80% by weight.

Component (c):

An emulsion polymer of 30% by weight acrylonitrile and 70% by weight n-butylacrylate having an average particle diameter ($d_{50}$) of 0.2 μm, a gel content of 93% by weight and a swelling index of 14; the copolymer was obtained by crosslinking terpolymerization with triallylcyanurate.

Component (d):

An emulsion polymer of 66% by weight methylmethacrylate and 34% by weight acrylonitrile having an intrinsic viscosity of 5.4 dl/g (in dimethylformamide).

Comparison polymer B for component (b)

(B1) An emulsion graft polymer having the same gross composition as component (b), prepared in a graft yield of 52% by weight.

(B2) An emulsion graft polymer of 75% by weight of the coarse-particle polybutadiene used for component B1 or (b) and 25% by weight of the styrene/acrylonitrile resin used for component B1 or (b); the product was obtained in a graft yield of 49% by weight.

PVC:

Polyvinyl chloride having a K value of 70.

Plasticizers:

P1: Diisodecylphthalate

P2: An ethylene/vinyl acetate copolymer having a vinyl acetate content of 70% by weight and an average molecular weight of 200,000 g/mol.

Resin component R:

An emulsion copolymer of 69% by weight α-methylstyrene and 31% by weight acrylonitrile having an intrinsic viscosity [$\eta$] of 0.6 dl/g [in dimethylformamide].

Preparation of the polymer mixtures according to the invention containing (a) to (d):

The emulsions of components (a) to (d) are mixed with one another at room temperature in the mixing ratios shown in Table 1, based on polymer solids of the emulsion, stabilized with 1.2% by weight, based on solids, of a phenolic antioxidant and coagulated with aqueous MgSO$_4$ solution at temperatures of 70° to 98° C. filtered, washed and dried to form a powder.

Preparation of the polyvinyl chloride (PVC) molding compositions and test specimens:

To prepare the PVC molding compositions, the polymer mixtures shown in Table 1, PVC, plasticizers (P1, P2) and resin component (R) were combined in the quantities by weight shown in Table 2 and also with 2% by weight Ba/Cd laurate (solid), 0.3% by weight sterically hindered phenolic antioxidant (solid) and 0.2% by weight ester wax, homogenized for 15 minutes at 180° C. on mixing rolls and molded at 190° C. to form test specimens. The properties of the test specimens thus obtained are shown in Table 3.

TABLE 1

Composition of the polymer mixtures according to the invention and comparison polymer mixtures (*) (in parts by weight)

| No. | (a) | (b) | (c) | (d) | (B1) | (B2) |
|---|---|---|---|---|---|---|
| 1 | 40 | 18 | 40 | 2 | — | — |
| 2* | 40 | — | 40 | 2 | 18 | — |
| 3* | 40 | — | 40 | 2 | — | 18 |

TABLE 2

Composition of the PVC molding compositions (in parts by weight, * = comparison molding compositions)

| No. | Polymer mixture of Table 1 [no./parts by weight] | PVC | P1 | P2 | R |
|---|---|---|---|---|---|
| I | 1/100 | 90 | 35 | — | — |
| II* | 2*/100 | 90 | 35 | — | — |
| III* | 3*/100 | 90 | 35 | — | — |
| IV | 1/50 | 50 | — | 40 | 20 |
| V* | 2*/50 | 50 | — | 40 | 20 |
| VI* | 3*/50 | 50 | — | 40 | 20 |

TABLE 3

Mechanical data of the PVC molding compositions I–VI* (for composition, see Table 2)

| Molding composition no. | Tensile strength DIN 53 455 [MPa] | Elongation DIN 53 455 [%] | Tear propagation resistance DIN 53 515 [N/mm] | Shore hardness DIN 53 505 [15''] | Vicat A [°C.] | Low temperature resistance DIN 51 949 [−50° C./mandrel diameter 10 mm] |
|---|---|---|---|---|---|---|
| I | 20.1 | 200 | 74 | 55 | 72 | unbroken |
| II* | 21.0 | 196 | 78 | 55 | 70 | broken |
| III* | 18.1 | 187 | 71 | 51 | 67 | broken |
| IV | 31.2 | 245 | 80 | 55 | 80 | unbroken |
| V* | 30.8 | 231 | 88 | 57 | 79 | broken |
| VI* | 26.5 | 232 | 74 | 51 | 70 | broken |

*comparison molding compositions

The values in Table 3 show that the polymer mixture 1 according to the invention in PvC molding compositions leads to improved elongation and/or low temperature resistance compared with comparison compositions.

Comparison molding compositions III* and VI* with their increased rubber contents unexpectedly produce poorer low temperature resistance than I and Iv and, in addition, poorer mechanical properties, such as elongation and Vicat softening point. In other words, the desired elongation values and low temperature resistance cannot be obtained with conventional rubbers as component (b), even in large amounts.

We claim:

1. A polymer mixture of
   (a) 45 to 50 parts by weight of a graft product of a mixture of 25 to 40 parts by weight acrylonitrile and 75 to 60 parts by weight styrene, α-methylstyrene, alkylmethacrylate or mixtures thereof on a particulate, highly crosslinked diene rubber with a gel content greater than 70% by weight and average particle diameters of 0.1 to 0.5 μm, said graft having a rubber content of 20 to 40% by weight,
   (b) 45 to 10 parts weight of a graft product of a mixture of 20 to 35 parts by weight acrylonitrile and 80 to 65 parts by weight styrene or α-methylstyrene on a particulate, highly crosslinked diene rubber with a gel content greater than 70% by weight and average particle diameters of 0.2 to 0.6 μm, said graft having a rubber content of 50 to 75% by weight, the graft yield being greater than 60% by weight,
   (c) 10 to 50 parts by weight of a particulate, partially crosslinked rubber-like copolymer of a $C_2$–$C_8$ alkylacrylate and/or butadiene containing up to 40% by weight (based on copolymer) acrylonitrile which has an average particle diameter ($d_{50}$) of 0.1 to 0.3 μm and a gel content of 40 to 88% by weight.

2. A polymer mixture according to claim 1 additionally containing up to 5 parts by weight of a high molecular weight, uncrosslinked copolymer of styrene or methylmethacrylate and up to 40% by weight acrylonitrile having an intrinsic viscosity [η] (in dimethylformamide at 20° C.) of >4 dl/g.

3. A polymer mixture as claimed in claim 1 in the form of a free-flowing, dry powder.

4. A process for the production of the polymer mixtures claimed in claim 1, characterized in that latices of components (a) to (c) are mixed in such a way that coagulation is avoided, after which the mixture is coagulated in known manner.

5. A method of improving polyvinyl chloride molding compositions by adding effective amounts of the polymer mixture according to claim 1.

* * * * *